Figures 1, 2:
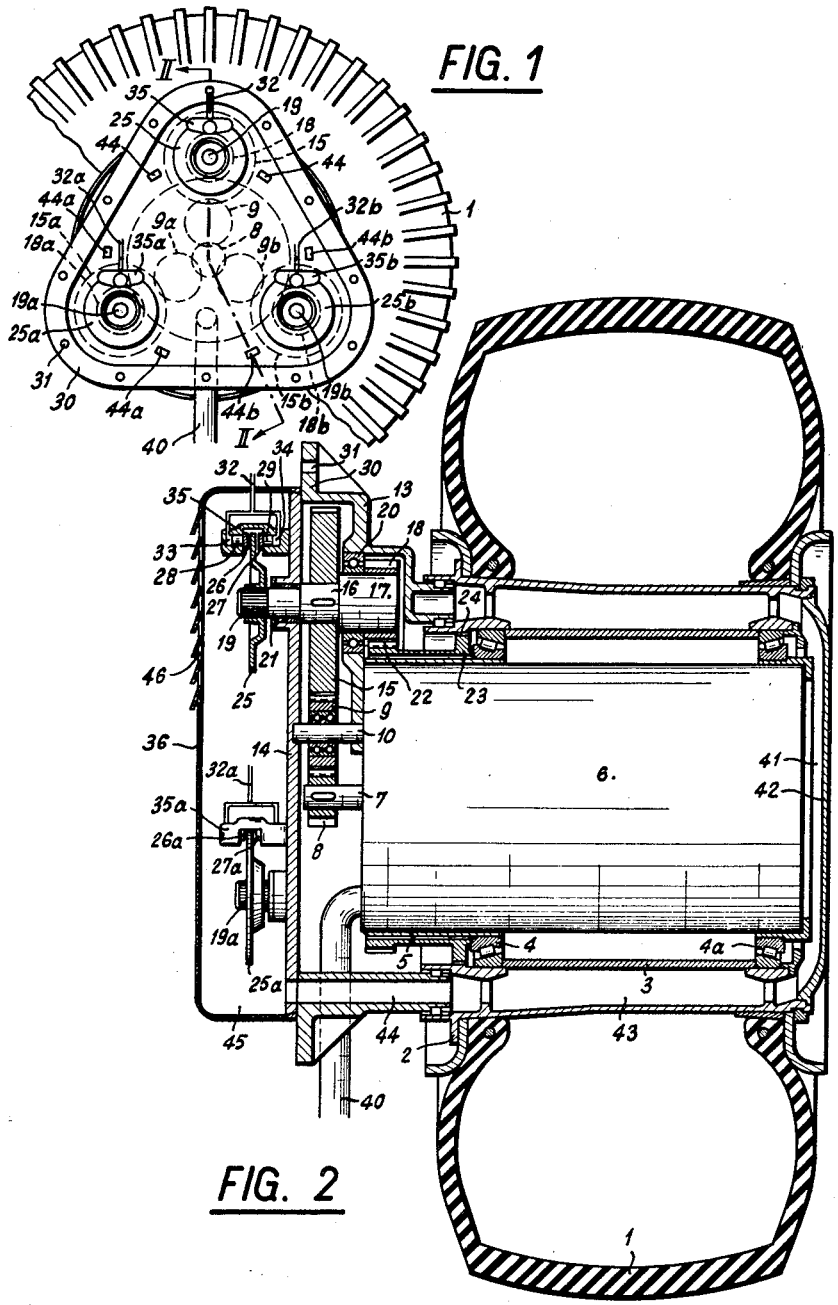

Dec. 15, 1964     G. BOULADON ETAL     3,161,249
ELECTRIC DRIVING WHEEL EQUIPPED WITH A BRAKING SYSTEM
Filed July 17, 1962

United States Patent Office 3,161,249
Patented Dec. 15, 1964

3,161,249
ELECTRIC DRIVING WHEEL EQUIPPED WITH A BRAKING SYSTEM
Gabriel Bouladon and Paul Zuppiger, Carouge, Geneva, Switzerland, assignors to Automobiles M. Berliet, Lyon, France, a firm
Filed July 17, 1962, Ser. No. 210,437
Claims priority, application Switzerland, July 17, 1961, 8,388/61
7 Claims. (Cl. 180—10)

The present invention relates to an electric driving wheel assembly comprising an electric motor mounted in the hub of the wheel, and a speed-reduction gear formed of several identical gear trains, driven in parallel by a common pinion mounted on a motor-shaft and driving a common toothed ring secured to the rim.

Such an electric driving wheel assembly is known, but the braking thereof presents several problems, particularly when the wheel is of large dimensions and the motor is of high power needed for such purposes as driving heavy vehicles used as at a construction site. It is possible, a priori, to provide a brake either on the rim itself or on the motor shaft. The disadvantage of the first possibility is the high braking torque which the brake must apply, this necessitating a brake of large dimensions which is therefore cumbersome. The second possibility enables a brake of small dimensions to be used, because the braking torque is reduced in a ratio equal to the reduction ratio of the reduction gear, but the speed of the driven member of the brake is increased in the same ratio, and this leads to a very rapid wear of the friction elements, especially when the brake is used only for slowing down the wheel and not for stopping it, as is the most frequent case.

The invention has for an object the obviation of these disadvantages.

In accordance with the present invention there is provided an electric driving wheel assembly, comprising an electric motor mounted in the wheel hub, a speed-reduction gear formed by two or more identical gear trains driven in parallel by a common pinion mounted on the motor shaft and driving a common toothed ring fast with the wheel rim, and a braking system comprising two or more identical brake assemblies each of which is arranged to act on a respective one of the gear trains.

For a better understanding of the invention and to show how the same may be carried into effect reference will now be made, by way of example, to the accompanying drawings in which:

FIGURE 1 is an elevation, and
FIGURE 2 is a partial section along the line II—II of FIGURE 1, to a larger scale.

As will be seen from FIGURES 1 and 2, the electric driving wheel assembly comprises a pneumatic tire 1 mounted on a rim 2 and having a hub 3. This hub 3 rotates by means of roller bearings 4 and $4_a$ on a shaft 5 fast with the stator 6 of an electric motor shown unsectioned in FIGURE 2. This stator 6 is fixed by conventional means on a frame 13, a flange 30 formed with holes such as 31 enabling the assembly to be secured to the chassis (not shown) of the vehicle. The shaft 7 of the rotor (not shown) of this motor carries a pinion 8 or drive gear which meshes with an intermediate gear 9 turning about a shaft 10 fixed in the frame 13 of the gearing and in the cover 14 of this frame. The intermediate gear 9 in its turn acts on a gear 15 keyed on the middle of a shaft 16, the inner end 17 of which is constructed as a pinion 18, while the other end carries grooves 19. This shaft 16 is supported by a ball bearing 20 mounted in the frame 13 and a bearing 21 formed in the cover 14. The pinion 18 engages the teeth 22 of a ring or driven gear freely mounted in the hub 3, with which it is held fast with the rim 2 against rotation because of grooves or splines 24. In the embodiment illustrated, the electric driving wheel assembly comprises three gear trains identical with that which has just been described. These three trains can be seen in FIGURE 1, the two trains not shown in FIGURE 2 bearing the reference $9_a$, $15_a$, and $18_a$ and $9_b$, $15_b$ and $18_b$, respectively. Each of the grooved ends 19, $19_a$ and $19_b$ of the shafts, such as 16, carries a brake disc 25, $25_a$ and $25_b$, on which acts a pair of shoes 26 and 27 provided with linings having a high friction coefficient. The shoes of each pair are situated on either side of each of the brake discs 25, $25_a$ and $25_b$, and are urged against the disc by means of pistons 28 and 29, on which is arranged to act a fluid under pressure admitted through the pipes 32, $32_a$ and $32_b$. A cap 36, shown in FIGURE 2 but not in FIGURE 1, covers the assembly of the brakes and is clipped on the cover 14 of the frame 13. A pipe 40 serves for supplying to the interior of the stator 6 the air intended for the cooling of the electric motor by forced circulation. After having passed through the motor, this air escapes into the space 41 between the stator 6 and a cover 42, flows through the ducts 43 distributed around the wheel hub 3 and discharges to the right of the brakes through pipes 44 into the space 45 between the cap 36 and the cover 14. It is discharged to the atmosphere through slots 46 formed in the cap 36.

The operation of the braking system which has just been described is simple. The admission of fluid under pressure in the pipes 32, $32_a$ and $32_b$ causes the application of the pairs of shoes, such as 26 and 27. It will be seen that the adopted arrangement has the result that each of these pairs only has a fraction of the total braking energy to be dissipated, this enabling the dimensions of the discs to be reduced. As the discs are secured to an intermediate shaft of the transmission, they turn at a speed lower than that of the motor rotor and consequently the wear thereon is reduced by comparison with that which would effect a brake acting on a disc secured to the rotor. The air current discharging to the right of the brakes ensures an efficient cooling of the latter.

As a modification of the embodiment described, it is readily possible to imagine a mechanical control for the application of the shoes or even a magnetic control.

Another modification consists in replacing the single cap 36 by separate caps enclosing each brake.

What is claimed is:

1. An electric driving wheel assembly comprising, a stub-axle structure adapted to be secured to a vehicle chassis and including an electric motor having a drive shaft, said assembly further including a wheel rim rotatably on said stub-axle structure, a drive gear associated with said drive shaft for rotating with said shaft, a driven gear associated with said wheel rim for rotating with said rim, and gearing and brake means for the drive of said motor to be transmitted to said wheel rim and for said wheel rim to be braked, said gearing and brake means including a plurality of individually corresponding transmission gears having like reduction speeds in diminishment of the speed of said drive gear and rotatably mounted on said stub-axle structure, said transmission gears correspondingly being in like gear trains with said drive gear and said driven gear and being in driven relation to said drive gear and in driving relation to said driven gear, and said gearing and brake means further including a plurality of similar brake means each to dissipate a fraction of total energy to be braked and each comprising a first component connected intermediately of a corresponding one of said gear trains with said transmission gear of the train to rotate at the speed of the other of said first components and intermediate the speeds of said drive gear and said driven gear for said wheel rim to be braked, and each of said brake means further comprising a second component on said stub-axle structure adjacent to a corresponding said first component correspondingly to engage said first component with a braking force.

2. An electric driving wheel assembly comprising, a stub-axle structure adapted to be secured to a vehicle chassis and including an electric motor having a drive shaft, said assembly further including a wheel rim rotatably on said stub-axle structure and surrounding said motor substantially coaxially of said drive shaft, a drive gear associated with an end of said drive shaft for rotating with said shaft, a ring gear associated substantially coaxially with said wheel rim for rotating with said rim, and gearing and brake means adjacent to said end of said drive shaft for the drive of said motor to be transmitted to said wheel rim and for said wheel rim to be braked, said gearing and brake means including a plurality of individually corresponding transmission gears having like reduction speeds in diminishment of the speed of said drive gear and rotatably mounted on said stub-axle structure having their axes substantially parallel to said drive shaft axis, said transmission gears correspondingly being in like gear trains with said drive gear and said driven gear and being in driven relation to said drive gear and in driving relation to said driven gear, and said gearing and brake means further including a plurality of similar brake means each to dissipate a fraction of total energy to be braked and each comprising a rotary first component connected intermediately of a corresponding one of said gear trains with said transmission gear of the train to rotate with said transmission gear of the train at the speed of the other of said first components and intermediate the speeds of said drive gear and said driven gear for said wheel rim to be braked, and each of said brake means further comprising a second component on said stub-axle structure adjacent to a corresponding said first component correspondingly to engage said first component with a braking force.

3. The electric driving wheel assembly set forth in claim 2, wherein each of said first components is connected with said corresponding one of said transmission gears to rotate at the same speed as said corresponding one of said transmission gears.

4. The electric driving wheel assembly set forth in claim 3, wherein each of said first components has a shaft in common with said corresponding one of said transmission gears.

5. The electric driving wheel assembly set forth in claim 2, wherein each of said first components includes an air cooled disc, and the corresponding said second component includes a pair of brake shoes oppositely movably mounted on said stub-axle structure to engage opposite side faces of said disc with a braking force.

6. An electric driving wheel assembly comprising, a stub-axle structure including a frame and an electric motor united with said frame, said motor having a drive shaft and said frame including vented hollow cover means adjacent to one of said drive shaft and adapted to be secured to the chassis of a vehicle, said assembly further including a wheel rim rotatably on said stub-axle structure and surrounding said motor substantially coaxially of said drive shaft, a drive gear associated with said end of said drive shaft for rotating with said shaft, a ring gear associated substantially coaxially with said wheel rim for rotating with said rim, and gearing and brake means adjacent to said end of said drive shaft for the drive of said motor to be transmitted to said wheel rim and for said wheel rim to be braked, said gearing and brake means including a plurality of individually corresponding transmission gears having like reduction speeds in diminishment of the speed of said drive gear and rotatably mounted on said frame having their axes substantially parallel to said drive shaft axis, said transmission gears correspondingly being in like gear trains with said drive gear and said ring gear and being in driven relation to said drive gear and in driving relation to said ring gear, and said gearing and brake means further including a plurality of similar brake means for dissipating corresponding fractions of total energy to be braked and disposed within said hollow cover means for transferring heat to a fluid vented by said cover means, each of said plurality of brake means comprising a first component connected intermediately of a corresponding one of said gear trains with said transmission gear of the train to rotate at the speed of the other of said first components and intermediate the speeds of said drive gear and ring gear for said wheel rim to be braked, and each said brake means further including a second component on said frame adjacent to a corresponding said first component correspondigly to engage said first component with a braking force.

7. The electric driving wheel assembly set forth in claim 6, wherein said vented cover means is vented to the atmosphere and each of said first components includes an air cooled disc.

References Cited by the Examiner
UNITED STATES PATENTS

| | | | |
|---|---|---|---|
| 1,840,407 | 1/32 | Norman | 180—43 |
| 2,376,419 | 5/45 | Cole | 180—43 |
| 2,726,726 | 12/55 | LeTourneau | 180—10 |
| 2,982,370 | 5/61 | Lee et al. | 180—43 |
| 3,035,652 | 5/62 | McLean | 180—10 |
| 3,038,564 | 6/62 | Lee et al. | 188—264 |

A. HARRY LEVY, *Primary Examiner.*
LEO FRIAGLIA, *Examiner.*